Sept. 25, 1934.   R. F. STEENECK   1,974,591
SPRING CONNECTION
Filed Aug. 9, 1932   3 Sheets-Sheet 1

INVENTOR
Robert F. Steeneck
BY
ATTORNEYS.

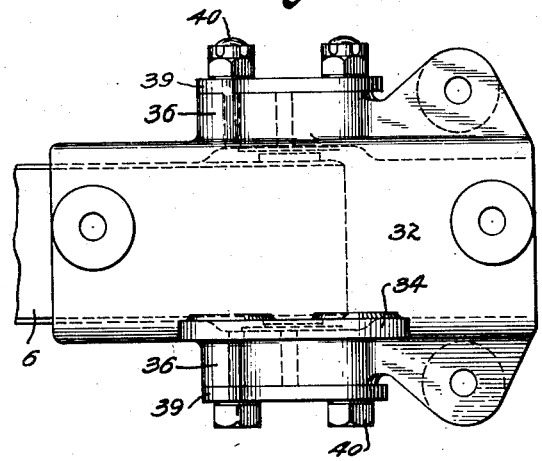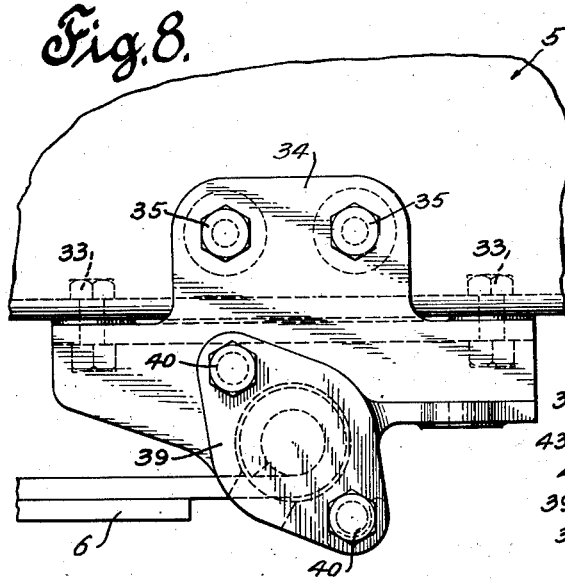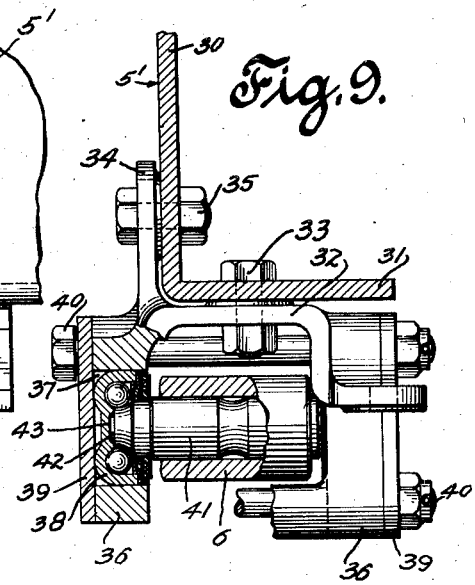

Patented Sept. 25, 1934

1,974,591

UNITED STATES PATENT OFFICE 1,974,591

SPRING CONNECTION

Robert F. Steeneck, Detroit, Mich., assignor to The Fafnir Bearing Company, New Britain, Conn., a corporation of Connecticut Application August 9, 1932, Serial No. 628,056

1 Claim. (Cl. 267—54)

My invention relates to a spring connection and more particularly to a hinge end connection.

It is the general object of the invention to provide a spring connection which is simple in construction, sturdy, of few parts, simply assembled, and not likely to get out of order.

It is another object to provide a spring connection in which the forces arising therein are substantially equally distributed.

Other objects and features of invention will be hereinafter pointed out or will become apparent upon a reading of the specification.

In the drawings which show, for illustrative purposes only, preferred forms of the invention—

Fig. 7 is a top plan view of a spring connection and bracket illustrating a modified form of spring connection;

Fig. 8 is a side view in elevation of the parts shown in Fig. 7 assembled with a spring;

Fig. 9 is an end view in partial section of parts shown in Figs. 7 and 8.

Figure 1:
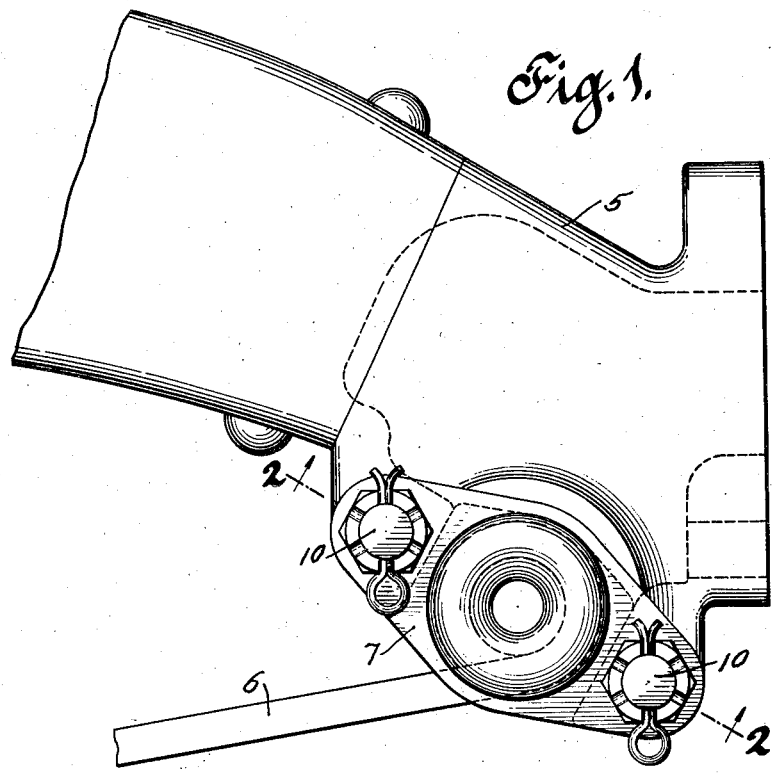
Fig. 1 is a fragmentary side view of a connected frame and spring and illustrating features of the invention.
Figure 2:
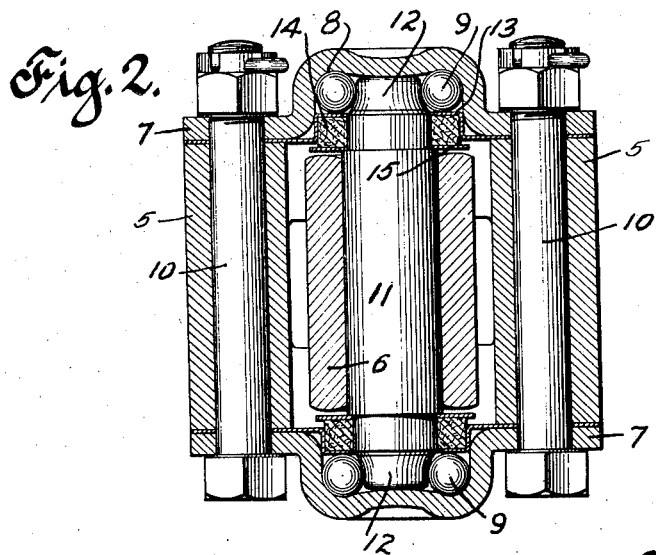
Fig. 2 is a sectional view taken substantially in the plane of the line 2—2 of Fig. 1.
Figure 5:
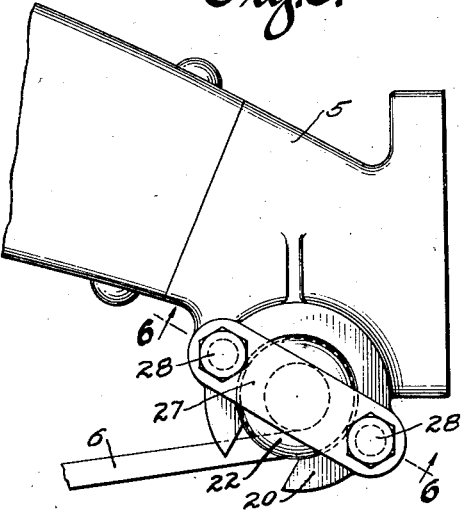
Fig. 5 is a view similar to Fig. 1, but illustrating a modified form of connection.

In the form shown in Figs. 1 and 2, 5 indicates a frame part, while 6 indicates a spring to be hingedly connected thereto. One of the members such as the frame 5 carries a bearing raceway means in the form of plates 7—7 each of generally symmetrical form and provided substantially centrally with a raceway 8 formed by cupping the plate 7, as will be understood. Anti-friction bearing members such as balls 9 may be carried by the raceway 8. The plates 7 are secured to the frame at opposite sides thereof preferably by means of through bolts 10—11 passing through both of the side plates and the frame part 5 or spaced apart lugs thereon.

The spring 6 has raceway means preferably in the form of a pin 11 having raceways 12—12 at opposite ends thereof for coaction with the anti-friction bearing members 9—9. The pin 11 is preferably of such length as to abut the plates 7—7 centrally of the raceways thereon so as to definitely space the same apart and so as to take end thrust loads between the frame and spring. The raceways are preferably designed so that the anti-friction bearing members 9 take only radial loads between the frame and spring. The length of the pin 11 is preferably such that the side plates or links 7—7 may be sprung slightly when the nuts on the through bolts 10—10 are drawn up to rigidly secure the plate 7—7 to the frame. Thus, all looseness and liability to rattle are eliminated.

The anti-friction bearing members 9—9 may be held in place in the side plates 7 when the latter are disassembled from the frame by means of a sheet metal plate member 13 which may be frictionally held in the cupped portion of each side plate, and the sheet metal plate 13 is preferably substantially coextensive with the side plate 7 so as to be interposed between the latter and the frame and be thus rigidly held in place when the hinge connection is assembled. Lubricant may be retained on and foreign matter excluded from the anti-friction bearing surfaces partly by means of the plate 13 and further by a felt or other dust ring 14. It may fit in the cupped plate 13 and it may be backed up by means of a sheet metal washer 15 carried by each of the projecting ends of the pin 11.

A very simple, cheap and effective hinge connection has thus been provided. Assembly and disassembly are a very simple operation, and there are no parts likely to get out of order. It will further be noted that the through bolts 10—10 are on opposite sides of a vertical diametrical plane through the bearing raceways. Since most of the forces between the frame and spring are in a vertical plane through the axis of the raceways, it will be seen that each of the bolts carries more or less the same loading. Such would not be the case with what may be termed a cantilever type of plate, which is secured at one part to the frame and has a substantially overhanging part constituting the raceways. The parts may therefore in many cases be made lighter and, consequently, cheaper than the so called cantilever types.

Figure 3:
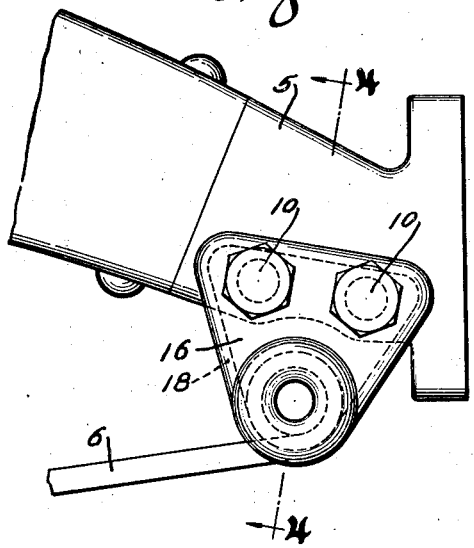
Fig. 3 is a view similar to Fig. 1 but illustrating a modified form of connection.
Figure 4:
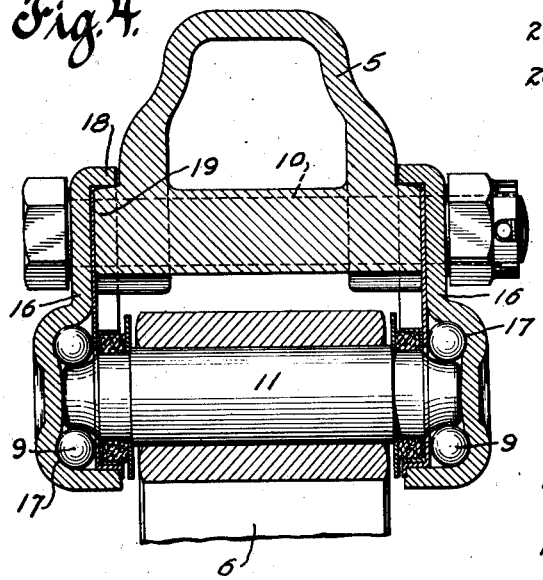
Fig. 4 is a sectional view taken substantially in the plane of the line 4—4 of Fig. 3.

In the form shown in Figs. 3 and 4, the construction and operation are quite similar to that of the forms shown in Figs. 1 and 2. In Figs. 3 and 4, the side plates 16 are secured to the frame 5 by means of through bolts 10—10 which are spaced on opposite sides of a vertical diametrical plane through the cupped raceways 17—17 thereon. The raceway portions of the side plates 16—16 overhang slightly but the forces are still more or less equally distributed between the two through bolts 10—10. In the Figs. 3-4 form, each side plate 16 is preferably provided with a marginal flange 18 surrounding the same so as to provide adequate stiffness and strength to the plates, and which flanges may overlap a projecting boss 19 at each side of the frame. As with the first form of the invention, the frame definitely spaces the side plates apart, and the pin or other bearing means 11 carried by the spring may serve to slightly stress the side plates by spacing the same apart whereby end thrusts are taken by the pin 11 and the side plates and radial loads are taken by the anti-friction bearing members.

Figure 6:
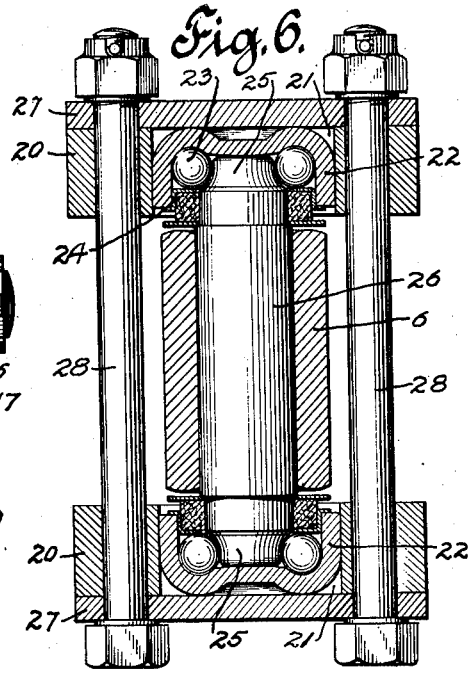
Fig. 6 is a sectional view taken substantially in the plane of the line 6—6 of Fig. 5.

In that form of the invention shown in Figs. 5 and 6, the frame part 5 is provided with spaced apart bosses 20—20 having alined bores 21—21. In each bore there is a bearing raceway member such as the bearing cup 22 which carries anti-friction bearing members such as balls 23. The balls may be held in place in the cups by means of a sheet metal cup-like retainer 24.

The spring 6 carries complementary raceway means preferably in the form of raceways 25 formed at the ends of a pin 26 carried by the spring eye. Balls 23 are interposed between the complementary raceways of the cups 22 and the raceways 25 on the pin. Means such as a retaining plate 27 is secured over each of the cups 22, and, in the form shown, the plate is a strip of metal which may be slightly resilient so as to provide a slight give in the finished hinge connection.

The plates 27—27 are secured to the frame 5 or the bosses 20—20 thereon preferably by means of through bolts 28—28 so that when the nuts on said through bolts are screwed up tight, the retaining plates 27—27 will be rigidly secured to the frame, and the through bolts furthermore resist any spreading tendency between the spaced apart bosses of the frame 5. The length of the pin 26 is preferably such as to engage the bearing cups 22 substantially centrally when the retaining plates 27—27 are in assembled condition with the frame. Thus, the frame itself, or rather the bosses thereon, sustain the bearing cups 22—22 in a radial direction, and the plates 27, together with the through bolts sustain the bearing cups against axial displacement in the bores, which through bolts also brace the spaced apart bosses and provide a sturdy construction.

In the form shown in Figs. 7, 8 and 9, 5′ indicates an intermediate portion of an automobile frame comprising a vertical web 30 and a horizontal flange 31. The frame part or bracket in this case comprises an angular form of bracket having a horizontal portion 32 to be secured to the horizontal flange 23 as by means of bolts 33. The bracket is further provided with a vertically extending flange 34 which is secured to the vertical web 30 of the frame by means of bolts 35.

The bracket has spaced apart bosses 36—36 which are provided with alined bores such as 37 for the reception of bearing raceways such as cups 38, the same or similar to those described in connection with Figs. 5 and 6. The cups 38 are held in the bores 37 by means of cover plates 39—39 covering the bores and secured to the bosses by means of through bolts 40—40, which not only retain the bearing cups in the bores, but serve to brace the spaced apart bosses relatively to each other and add to the sturdiness of the construction.

The bearing means such as the pin 41 carried by the spring eye interposed between the spaced apart bosses may be provided with a reduced end portion 42 to engage each of the bearing cups centrally and preferably in a depression 43 therein whereby end thrusts are taken between the bearing cups and bearing pin 41 as heretofore described in connection with the other forms of the invention.

The through bolts 40—40, as in the other forms, are preferably located on opposite sides of a vertical diametrical plane through the bearings so that the stresses are more or less equally divided between the through bolts and, in addition, the bolts 35—35 and 33—33, securing the bracket to the frame 5′, are preferably arranged on opposite sides of the same vertical plane for the same reason.

It will thus be seen that I have provided a spring connection, which is very sturdy and simple in construction and assembly, and not likely to get out of order.

While the invention has been described in considerable detail and various forms illustrated, it is to be understood that various changes, modifications, additions, and omissions may be made within the scope of the invention as defined in the appended claim.

I claim:

In a spring connection, a frame, a spring, bearing pin means fixedly carried by said spring and projecting from opposite sides thereof, a pair of plates on said frame at opposite sides thereof, each of said plates having an outwardly bowed portion forming a bearing cup on the inner side of said plate and extending over and engaging the ends of said bearing pin means, anti-friction bearing members seated in said cups and engaging the projecting portions of said pin means, means for retaining said anti-friction bearing members in said cups, and means positioned at opposite sides of a diametrical plane through said cups and bearing pin means for rigidly securing said plates to said frame, said last mentioned means constituting the sole support of said plates and serving to transmit loads between said frame and spring.

ROBERT F. STEENECK.